Feb. 7, 1933.       R. STRIGEL ET AL       1,896,758
MEANS FOR PURIFYING GASES ELECTRICALLY
Filed March 2, 1931

WITNESSES
R.S. Williams
S. A. Strickland

INVENTOR
Robert Strigel and
Wilhelm Feldmann
BY
ATTORNEY

Patented Feb. 7, 1933

1,896,758

UNITED STATES PATENT OFFICE

ROBERT STRIGEL, OF BERLIN-CHARLOTTENBURG, AND WILHELM FELDMANN, OF BERLIN-SPANDAU, GERMANY, ASSIGNORS TO WESTINGHOUSE ELECTRIC AND MANUFACTURING COMPANY, A CORPORATION OF PENNSYLVANIA

MEANS FOR PURIFYING GASES ELECTRICALLY

Application filed March 2, 1931, Serial No. 519,438, and in Germany April 29, 1930.

Our invention relates to electrical precipitators and particularly to charging electrodes for such precipitators.

Prior to our invention, it was known that preionizing the gas or rather the particles contained therein and precipitating the particles by subjecting the gas to a high-stress field would more effectively clean the gases than by subjecting them simultaneously to ionizing and stress fields. We have found that, by repeatedly subjecting gases to ionizing discharges and high-stress fields, the cleaning is much more complete than by any previous system.

It is an object of our invention, therefore, to provide a precipitator having an electrode adapted to apply alternately high-ionizing fields and high-stress or precipitation fields. This is best done by providing an electrode having alternating sections adapted for producing ionizing and stress fields.

Other objects and advantages of our invention will be apparent from the following detailed description, taken in conjunction with the accompanying drawing, in which.

Figure 1:
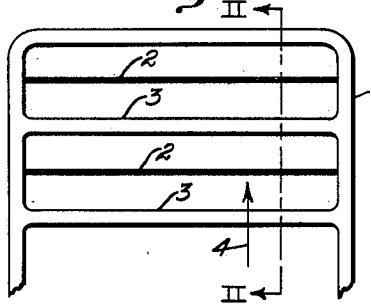
Figure 1 is an elevational view of a grid-like electrode embodying our invention.
Figure 2:
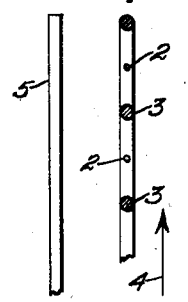
Fig. 2 is a sectional view showing the manner of assembling an electrode in a precipitator.

In the apparatus disclosed in the drawing, the frame 1 of the grid supports a plurality of electrode elements 2 and 3. The elements 2 are preferably of small diameter, such as small wires, so that they have a relatively small surface area per unit length and a sharp angle of curvature, and are particularly adapted for producing high ionization stresses or glow discharges. The electrode bars 3 are of comparatively large diameter, being preferably made of cylindrical rods, although, if desired, rods of other shape may be employed, having a comparatively large surface area per unit length, so that ionization does not readily occur at their surfaces but, instead, a high stress field is set up, so that, when the gas to be purified is passed by the electrodes in the direction shown by the arrow 4, the gas will be subjected to high ionizing stresses by the electrodes 2 and to high precipitating or stress fields by the electrodes 3. The alternate ionization and high stress effectively drive the impurities to the collecting electrodes 5, where they are deposited and may be removed from the collector in any desired manner.

Figure 3:
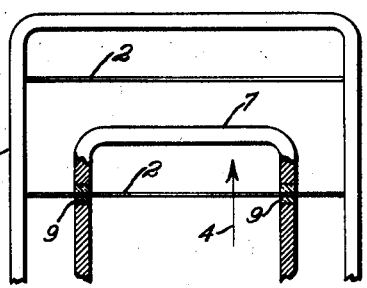
Fig. 3 is an elevational view, partly in section, of a modification of the grid electrode shown in Fig. 1.

We have found that it is frequently desirable to impress different voltages on the ionizing and on the stressing electrode elements. To accomplish this, the electrode elements 2 and 3 may either be insulated from the frame 1 in any desired manner (not shown) or, as shown in Fig. 3, an electrode 7 may be suspended upon the electrodes 2 by suitable insulators 9.

Figure 4:
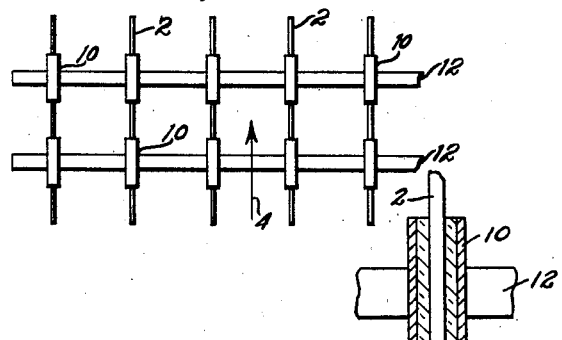
Fig. 4 is an elevational view of further modifications of the grid electrode.
Figure 5:
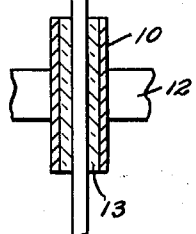
Fig. 5 is a sectional enlargement of a portion of the grid of Fig. 4.

In the modification shown in Fig. 4, the electrodes 2 have been disposed in the direction of the gas flow, and substantially tubular elements 10 placed around the electrodes at suitable distances therealong. If desired, the tubular electrodes may be connected together, as by cross pipes 12, thus forming substantially the same grill work as shown in Fig. 1. If it is desired to have the electrodes 2 and 10 at different potentials, an insulating tube 13 may be placed between the electrodes 2 and 10.

In either type of treater, the action on the gases is identical in that they are subjected alternately to high ionization stresses and to high precipitating stresses so as to effectively remove all particles or impurities from them in a more simple and more economical manner than has been possible heretofore.

While we have shown and described certain specific embodiments of our invention, it is apparent that changes and modifications may be made therein without departing from the spirit and scope of our invention. We desire, therefore, that only such limitations shall be imposed as are indicated in the accompanying claims or as may be necessitated by the prior art.

We claim as our invention:

1. In a gas treater, an electrode comprising sections of small surface area per unit length for facilitating an electric discharge therefrom, sections of comparatively large surface area per unit length for restricting electric discharge therefrom, said sections being disposed alternately, and means for insulating the sections from each other.

2. A gas treater electrode for supplying alternate fields of glow discharge and high-intensity-stress fields comprising a plurality of electrode elements in parallel relationship, said elements being alternately rods and fine wires.

3. A gas treater electrode for supplying alternate fields of glow discharge and high-intensity-stress fields comprising a plurality of electrode elements in parallel relationship, said elements being alternately rods and fine wires, and means for insulating the rods and the wires from each other.

4. A treater for the electrical purification of gases comprising collecting electrodes and charging electrodes, the charging electrode having alternate sections of such different diameters that the small sections are below the glow point for the treating voltage and the portions of larger diameter are above the glow point, the sections of smaller diameter being insulated from the sections of larger diameter.

In testimony whereof, we have hereunto subscribed our names this 24th day of January, 1931.

ROBERT STRIGEL.
WILHELM FELDMANN.